United States Patent
Akiyama

(10) Patent No.: US 11,333,960 B2
(45) Date of Patent: *May 17, 2022

(54) LIGHT SOURCE DEVICE AND PROJECTOR IN WHICH WAVE PLATES ARE DOWNSIZED

(71) Applicant: SEIKO EPSON CORPORATION, Tokyo (JP)

(72) Inventor: Koichi Akiyama, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/903,594

(22) Filed: Jun. 17, 2020

(65) Prior Publication Data

US 2020/0401026 A1    Dec. 24, 2020

(30) Foreign Application Priority Data

Jun. 18, 2019   (JP) .............................. JP2019-112552

(51) Int. Cl.
*G03B 21/20*    (2006.01)

(52) U.S. Cl.
CPC ......... *G03B 21/204* (2013.01); *G03B 21/208* (2013.01); *G03B 21/2013* (2013.01)

(58) Field of Classification Search
CPC .......................... G03B 21/2073; G03B 21/208; G03B 21/006; G03B 21/204; G03B 21/2013

See application file for complete search history.

(56) References Cited

U.S. PATENT DOCUMENTS

| | | | |
|---|---|---|---|
| 2012/0140183 A1 | 6/2012 | Tanaka et al. | |
| 2017/0195645 A1* | 7/2017 | Sakata | G02B 5/3083 |
| 2017/0208308 A1* | 7/2017 | Iguchi | G02B 27/48 |
| 2018/0017856 A1 | 1/2018 | Tanaka et al. | |
| 2018/0066828 A1* | 3/2018 | Akiyama | G02B 27/285 |
| 2018/0252992 A1* | 9/2018 | Akiyama | H04N 9/3164 |
| 2018/0275496 A1* | 9/2018 | Shimizu | G03B 21/204 |
| 2019/0064645 A1* | 2/2019 | Akiyama | G02B 5/3083 |
| 2019/0094672 A1* | 3/2019 | Akiyama | G03B 21/204 |

(Continued)

FOREIGN PATENT DOCUMENTS

| | | | |
|---|---|---|---|
| JP | 2012-137744 A | 7/2012 | |
| JP | 2017037175 A * | 2/2017 | G03B 21/14 |

(Continued)

*Primary Examiner* — Michelle M Iacoletti
*Assistant Examiner* — Magda Cruz
(74) *Attorney, Agent, or Firm* — Oliff PLC

(57) ABSTRACT

A light source device of the present disclosure includes a light emitting device, a first optical element having a first area and a second area, a second optical element converting a first light output from the first area into a second light, a diffuser element into which the second light is entered, and a wavelength conversion element into which the first light output from the second area is entered. The light output from the diffuser element and entered into the second optical element is converted into a third light, the third light output from the second optical element and entered into the first area is output from the first area, the light output from the diffuser element and entered into the second area is output from the second area, and a fourth light is output through the first area and the second area.

16 Claims, 6 Drawing Sheets

(56) References Cited

U.S. PATENT DOCUMENTS

2019/0391476 A1* 12/2019 Akiyama ............... G03B 33/12
2019/0391477 A1* 12/2019 Akiyama ........... G03B 21/2066

FOREIGN PATENT DOCUMENTS

| JP | 2018-013764 A | | 1/2018 | | |
|----|---------------|---|--------|---|---|
| JP | 2019061082 A | * | 4/2019 | ............ | G03B 21/14 |
| JP | 2020008722 A | * | 1/2020 | ............ | G03B 21/00 |

* cited by examiner

LIGHT SOURCE DEVICE AND PROJECTOR IN WHICH WAVE PLATES ARE DOWNSIZED

The present application is based on, and claims priority from JP Application Serial Number 2019-112552, filed Jun. 18, 2019, the disclosure of which is hereby incorporated by reference herein in its entirety.

BACKGROUND

1. Technical Field

The present disclosure relates to a light source device and projector.

2. Related Art

JP-A-2012-137744 discloses a light source device for projector that separates a light beam output from a solid-state light source unit into two beams using polarization separation and combining means and respectively guides the beams into an optical path for fluorescence generation and an optical path for diffused light generation, combines fluorescence generated by a fluorescence material and a diffused light generated by a diffuser using the polarization separation and combining means, and generates an illumination light. In the light source device, for the optical path for diffused light generation, a quarter wave plate for reflecting the light beam transmitted through the polarization separation and combining means and reflected by the diffuser using the polarization separation and combining means is necessary.

When the quarter wave plate is formed using crystal quartz, there is a problem that the cost of the light source device is higher because the crystal quartz is very expensive.

SUMMARY

A light source device according to a first aspect of the present disclosure includes a light emitting device that outputs a first light having a first wavelength in a first polarization direction, a first optical element having a first area that transmits or reflects the first light and a second area that reflects the first light when the first light is transmitted through the first area or transmits the first light when the first light is reflected by the first area, a second optical element into which the first light output from the first area of the first optical element is entered, converting the first light into a circularly-polarized second light having the first wavelength, a diffuser element into which the second light output from the second optical element is entered, and a wavelength conversion element into which the first light output from the second area of the first optical element is entered, wherein the light output from the diffuser element and entered into the second optical element is converted into a third light having the first wavelength in a second polarization direction by the second optical element, the third light output from the second optical element and entered into the first area of the first optical element is output from the first area, the light output from the diffuser element and entered into the second area of the first optical element is output from the second area of the first optical element, and a fourth light output from the wavelength conversion element and entered into the first area and the second area of the first optical element and having a second wavelength is output through the first area and the second area of the first optical element.

In the light source device according to the first aspect, in the first optical element, the first area may be provided at a center of the first optical element and the second area may be provided to surround the first area.

In the light source device according to the first aspect, the second optical element may be placed to face the first area at one side of the first optical element.

The light source device according to the first aspect may further include a detection unit that detects the light output from the first optical element, and a control unit that controls a quantity of the first light entered into the first area of the first optical element based on a detection result of the detection unit.

In the light source device according to the first aspect, the second optical element may be formed using quartz crystal.

The light source device according to the first aspect may further include a third optical element into which the third light output from the first area of the first optical element is entered, wherein the third optical element may convert the third light into a circularly-polarized fifth light having the first wavelength.

In the light source device according to the first aspect, the third optical element may be placed to face the first area at another side of the first optical element.

In the light source device according to the first aspect, the third optical element may be formed using quartz crystal.

A projector according to a second aspect of the present disclosure includes the light source device according to the aspect of the present disclosure, a light modulation device that modulates the light output from the light source device according to image information and forms an image light, and a projection optical device that projects the image light.

DESCRIPTION OF EXEMPLARY EMBODIMENTS

First Embodiment

As below, the first embodiment of the present disclosure will be explained using the drawings.

A projector of the embodiment is an example of a liquid crystal projector including alight source device using a semiconductor laser.

Note that, to clearly show the respective component elements in the following respective drawings, the scales of dimensions may be varied depending on the component elements.

Figure 1:
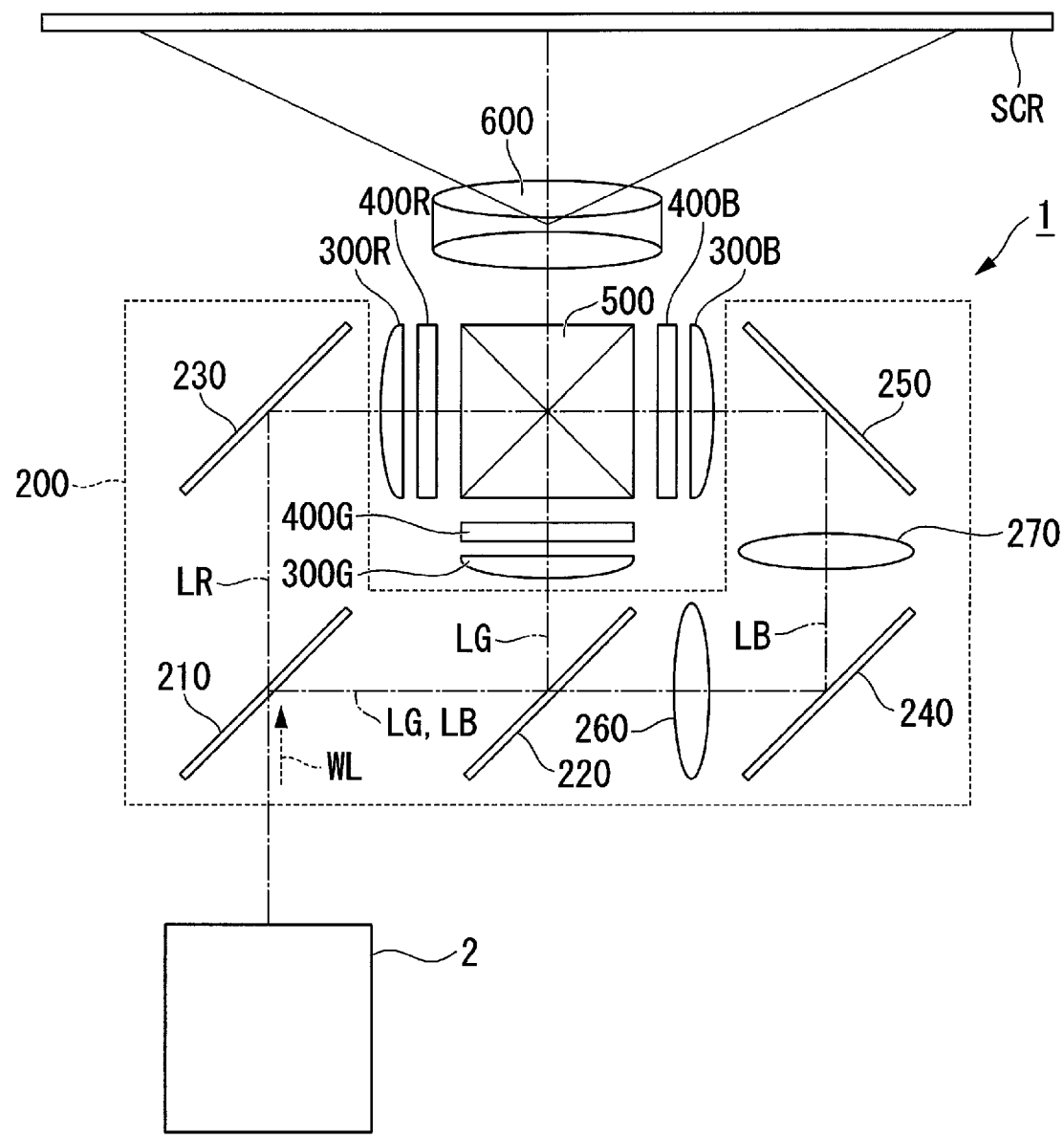
FIG. 1 is a schematic configuration diagram of a projector of a first embodiment.

FIG. 1 is the schematic configuration diagram of a projector 1 of the embodiment.

As shown in FIG. 1, the projector 1 includes a light source device 2, a color separation and light guiding system 200, a light modulation device for red light 400R, a light modulation device for green light 400G, a light modulation device for blue light 400B, a cross dichroic prism 500, and a projection optical system 600. The light modulation device for red light 400R, the light modulation device for green light 400G, and the light modulation device for blue light 400B of the embodiment correspond to a light modulation device in the appended claims.

In the embodiment, the light source device 2 outputs a white illumination light WL including a red light LR, a green light LG, and a blue light LB.

The color separation and light guiding system 200 includes a dichroic mirror 210, a dichroic mirror 220, a reflection mirror 230, a reflection mirror 240, a reflection mirror 250, a relay lens 260, and a relay lens 270. The color separation and light guiding system 200 separates the illumination light WL from the light source device 2 into the red light LR, the green light LG, and the blue light LB and guides the lights to the light modulation device for red light 400R, the light modulation device for green light 400G, and the light modulation device for blue light 400B.

A field lens 300R is placed between the color separation and light guiding system 200 and the light modulation device for red light 400R. A field lens 300G is placed between the color separation and light guiding system 200 and the light modulation device for green light 400G. A field lens 300B is placed between the color separation and light guiding system 200 and the light modulation device for blue light 400B.

The dichroic mirror 210 transmits the red light LR and reflects the green light LG and the blue light LB. The dichroic mirror 220 reflects the green light LG and transmits the blue light LB. The reflection mirror 230 reflects the red light LR. The reflection mirror 240 and the reflection mirror 250 reflect the blue light LB.

The light modulation device for red light 400R, the light modulation device for green light 400G, and the light modulation device for blue light 400B are respectively formed using liquid crystal panels that modulate incident color lights according to image information and form images.

Note that a light incident-side polarizer (not shown) is placed between the field lens 300R and the light modulation device for red light 400R. A light incident-side polarizer (not shown) is placed between the field lens 300G and the light modulation device for green light 400G. A light incident-side polarizer (not shown) is placed between the field lens 300B and the light modulation device for blue light 400B. A light exiting-side polarizer is placed between the light modulation device for red light 400R and the cross dichroic prism 500. A light exiting-side polarizer is placed between the light modulation device for green light 400G and the cross dichroic prism 500. A light exiting-side polarizer is placed between the light modulation device for blue light 400B and the cross dichroic prism 500.

The cross dichroic prism 500 combines the respective image lights output from the light modulation device for red light 400R, the light modulation device for green light 400G, and the light modulation device for blue light 400B and forms a color image. The cross dichroic prism 500 has a substantially square shape in a plan view formed by bonding of four rectangular prisms and dielectric multilayer films are provided at substantially X-shaped interfaces at which the rectangular prisms are bonded.

The color image output from the cross dichroic prism 500 is enlarged and projected on a screen SCR by the projection optical system 600.

Light Source Device

Figure 2:
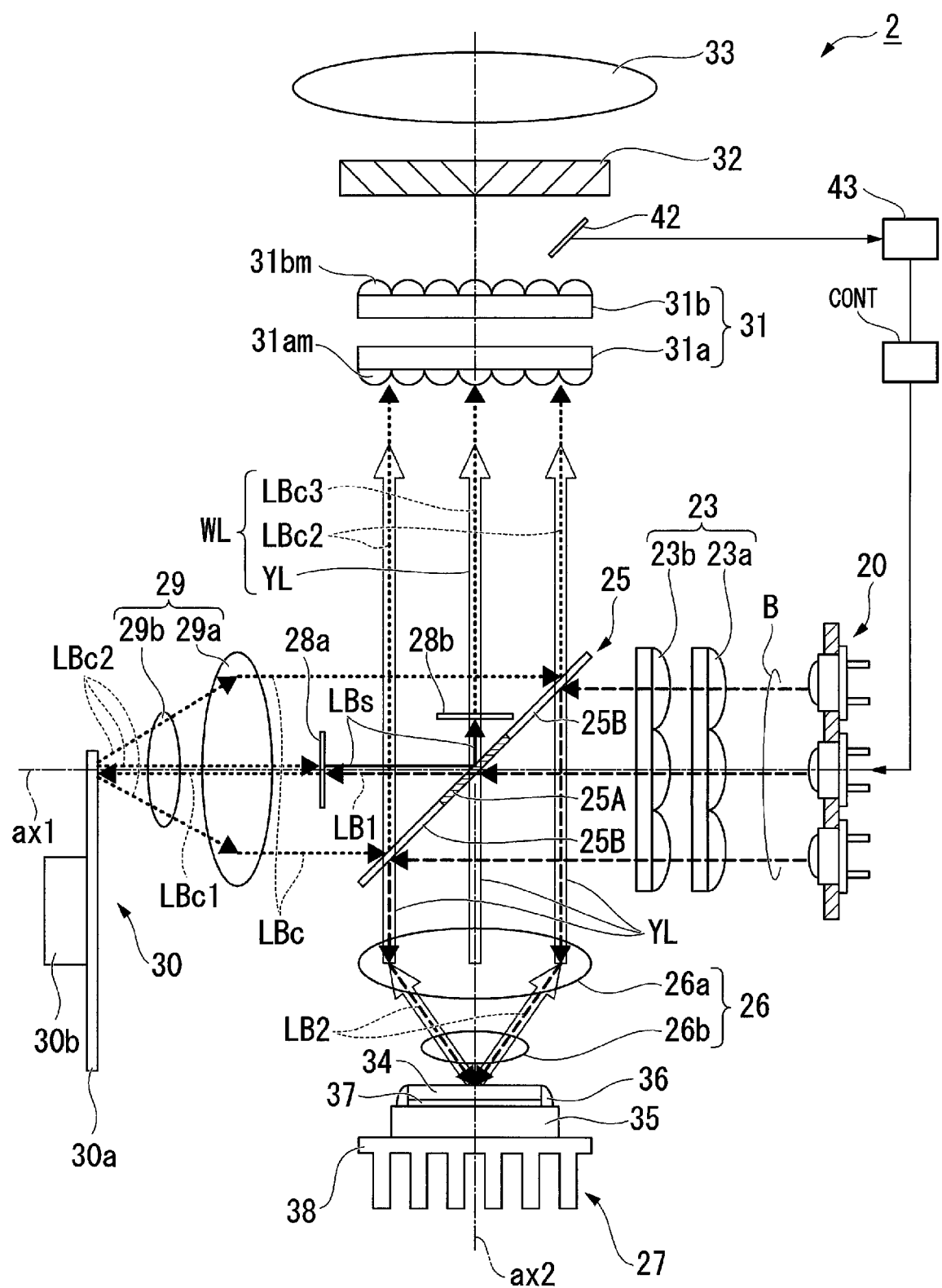
FIG. 2 shows a schematic configuration of a light source device.

Subsequently, the light source device 2 will be explained. FIG. 2 shows the schematic configuration of the light source device 2.

As shown in FIG. 2, the light source device 2 includes a blue array light source (light emitting device) 20, a homogenizer system 23, a light separation and combining element (first optical element) 25, a first collecting system 26, a wavelength conversion element 27, a first wave plate (second optical element) 28a, a second collecting system 29, a diffuse reflection element (diffuser element) 30, a second wave plate (third optical element) 28b, an optical integration system 31, a polarization conversion element 32, a superimposing lens 33, a light quantity monitoring mirror 42, a sensor unit (detection unit) 43, and a control unit CONT.

The blue array light source 20, the homogenizer system 23, the light separation and combining element 25, the first wave plate 28a, the second collecting system 29, and the diffuse reflection element 30 are sequentially placed in juxtaposition on an optical axis ax1 of the blue array light source 20.

The wavelength conversion element 27, the first collecting system 26, the light separation and combining element 25, the second wave plate 28b, the optical integration system 31, the polarization conversion element 32, and the superimposing lens 33 are sequentially placed in juxtaposition on an illumination light axis ax2. The optical axis ax1 and the illumination light axis ax2 are within the same plane and orthogonal to each other.

The blue array light source 20 is explained.

Figure 3:
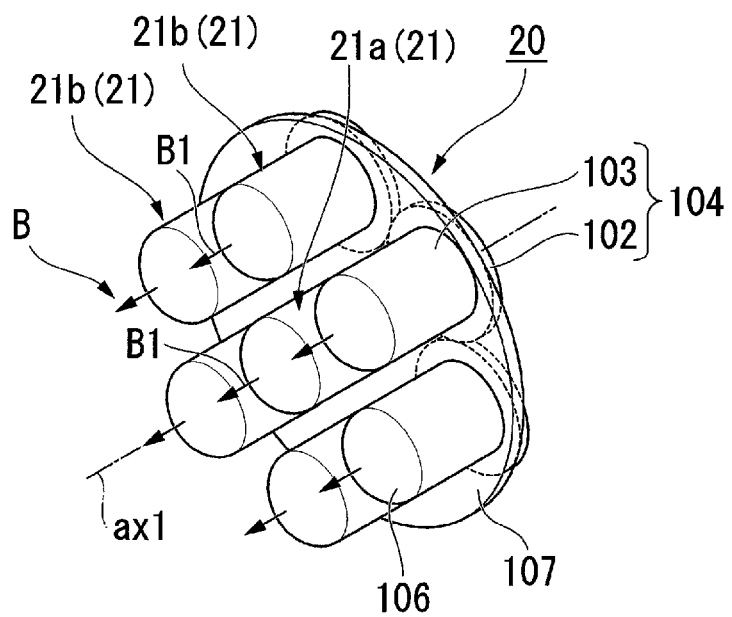
FIG. 3 is a perspective view of a blue array light source.
Figure 4:
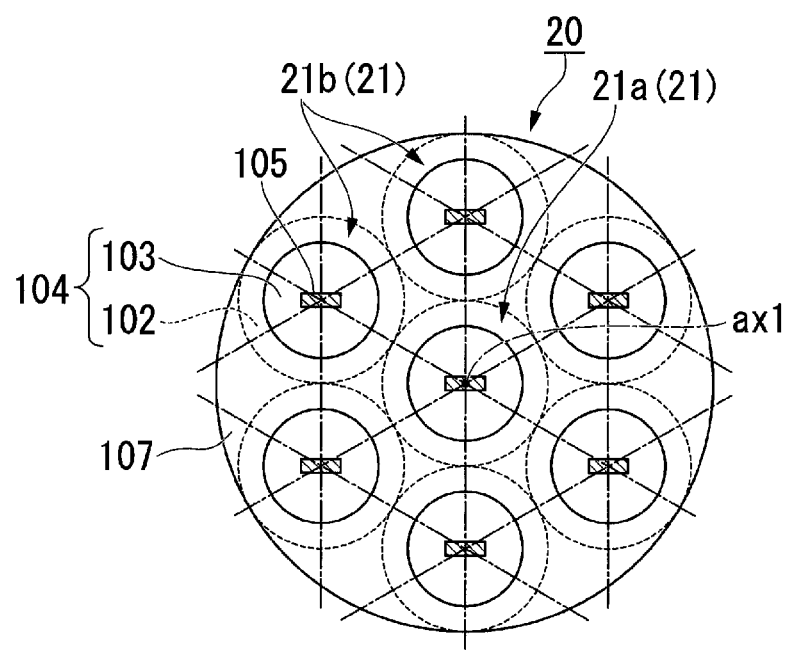
FIG. 4 is a plan view of the blue array light source as seen in a direction along an optical axis.

FIG. 3 is the perspective view of the blue array light source 20. FIG. 4 is the plan view of the blue array light source 20 as seen in a direction along the optical axis ax1.

As shown in FIGS. 3 and 4, the blue array light source 20 includes a plurality of light emitting elements 21. In the embodiment, the blue array light source 20 includes the seven light emitting elements 21. The seven light emitting elements 21 include one first light emitting element 21a located on the optical axis ax1 of the blue light LB, and six second light emitting elements 21b provided to surround the first light emitting element 21a. As described above, the surrounding six second light emitting elements 21b are provided substantially rotationally symmetrically around the optical axis ax1 of the blue light LB. The seven light emitting elements 21 are supported by a supporting member 107.

Each light emitting element 21 is formed using a semiconductor laser of CAN package type. The light emitting element 21 includes a package 104 having a base 102 and a can body 103, a semiconductor laser element 105 housed in the package 104, and a collimator lens 106. The semiconductor laser element 105 outputs e.g. a blue beam B1 having a peak wavelength from 440 nm to 470 nm (a first light having a first wavelength). The collimator lens 106 is provided in a light exiting opening of the package 104. The collimator lens 106 substantially parallelizes the blue beam B1 output from the semiconductor laser element 105.

As described above, the light emitting element 21 outputs the parallelized blue beam B1. The blue array light source 20 outputs a blue light B formed of the seven blue beams B1.

The principal rays of the respective plurality of blue beams B1 are parallel to one another. The blue beams B1 output from the respective semiconductor laser elements 105 are linearly-polarized beams. That is, the blue light B output from the blue array light source 20 is a linear-polarized light.

The blue light B output from the blue array light source 20 enters the homogenizer system 23. The homogenizer system 23 has multi-lenses 23a, 23b. The homogenizer system 23 homogenizes the illuminance distribution of the wavelength conversion element 27 as an illuminated region with the first collecting system 26. Further, the homogenizer system 23 homogenizes the illuminance distribution of the diffuse reflection element 30 as an illuminated region with the second collecting system 29. The blue light B transmitted through the homogenizer system 23 enters the light separation and combining element 25.

Figure 5:
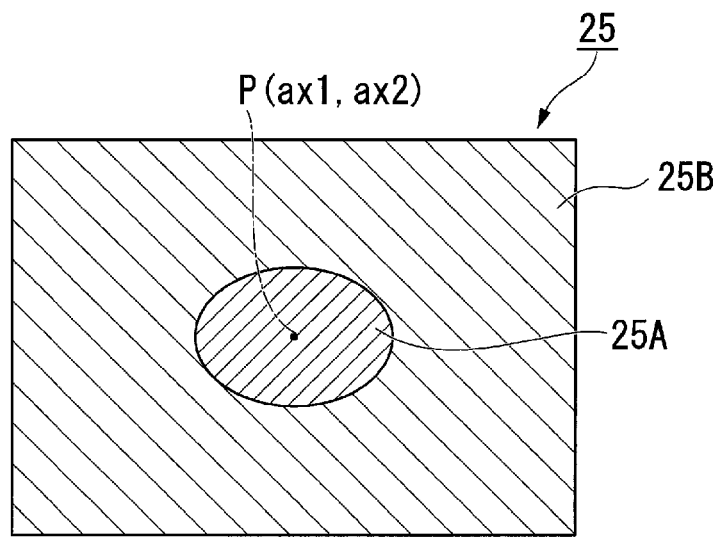
FIG. 5 shows a planar configuration of a light separation and combining element.
Figure 6:
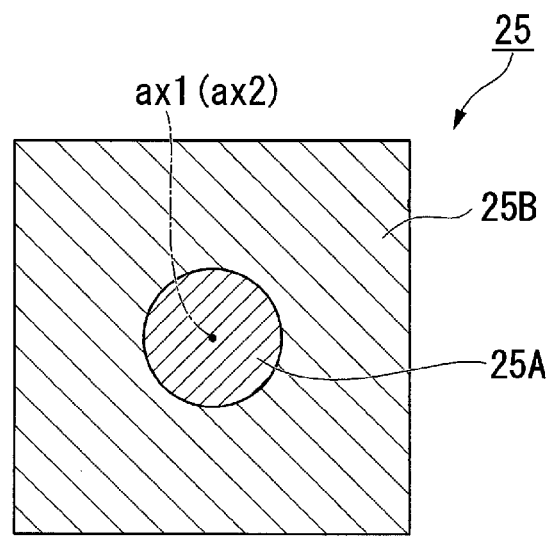
FIG. 6 shows a perspective configuration of the light separation and combining element.

FIG. 5 shows the planar configuration of the light separation and combining element 25. FIG. 5 is a plan view as seen from the normal direction in the surface of the light separation and combining element 25. FIG. 6 shows the perspective configuration of the light separation and combining element 25. FIG. 6 shows the configuration of the light separation and combining element 25 in a plan view in a direction along the optical axis ax1 or the illumination light axis ax2 in FIG. 2.

As shown in FIG. 5, the light separation and combining element 25 includes a first area 25A and a second area 25B. The first area 25A is an area transmitting the blue light B. The second area 25B is an area reflecting the blue light B.

The first area 25A is formed using a polarization beam splitter. The polarization beam splitter has a polarization separation function of separating the light entering the first area 25A into an S-polarized light and a P-polarized light. That is, the first area 25A transmits the light entering the polarization beam splitter as the P-polarized light and reflects the light entering the polarization beam splitter as the S-polarized light.

In the embodiment, the blue light B output from the blue array light source 20 is the P-polarized light (in a first polarization direction) with respect to the polarization beam splitter, and the first area 25A can transmit the blue light B as described above. In the embodiment, the blue light B corresponds to the first light having the first wavelength in the first polarization direction. Here, whether the blue light B output from the blue array light source 20 is the P-polarized light or the S-polarized light with respect to the first area 25A of the light separation and combining element 25 may be changed by rotation of the placement state of the blue array light source 20 about the optical axis ax1 as a rotation axis.

Further, the polarization beam splitter forming the first area 25A has a color separation function of transmitting a fluorescent light YL output from the wavelength conversion element 27 and having a different wavelength range from the blue light B (a fourth light having a second wavelength) regardless of the polarization state thereof.

The second area 25B is formed using a dichroic mirror. The dichroic mirror has an optical property of reflecting the blue light B and transmitting the fluorescent light YL.

As shown in FIG. 2, the first area 25A transmits part of the blue light B entering the light separation and combining element 25 toward the diffuse reflection element 30 side, and the second area 25B reflects the rest of the blue light B entering the light separation and combining element 25 toward the wavelength conversion element 27 side. The first area 25A is set in a size that can take in the light at a ratio from 15% to 25% of the entire quantity of the blue light B output from the blue array light source 20. Hereinafter, the blue light B transmitted through the first area 25A is referred to as "blue light LB1" and the blue light B reflected by the second area 25B is referred to as "blue light LB2".

As shown in FIG. 5, in the light separation and combining element 25, the first area 25A is placed at the center of the light separation and combining element 25. Further, the second area 25B is provided to surround the first area 25A. The planar shape of the light separation and combining element 25 is a rectangular shape and the planar shape of the first area 25A is an oval shape. The optical axis ax1 and the illumination light axis ax2 pass through the center of the light separation and combining element 25. That is, the first area 25A is provided on the optical axis ax1 and the illumination light axis ax2. An intersection point P of the optical axis ax1 and the illumination light axis ax2 is located at the center of the first area 25A.

As shown in FIG. 6, in the light separation and combining element 25 of the embodiment, the center of the first area 25A coincides with the intersection point P of the optical axis ax1 and the illumination light axis ax2. The light separation and combining element 25 is placed at an angle of 45° relative to the optical axis ax1 and the illumination light axis ax2. In the plan view of the light separation and combining element 25 in the direction along the optical axis ax1, the planar shape of the first area 25A is a circular shape as shown in FIG. 6.

In the embodiment, the optical axis ax1 passes through the center of the first area 25A. Accordingly, the blue beam B1 output from the first light emitting element 21a (see FIG. 4) placed on the optical axis ax1 of the plurality of light emitting elements 21 forming the blue array light source 20 enters the first area 25A. Therefore, the quantity of the light entering the first area 25A is determined according to the quantity of the light of the first light emitting element 21a.

The first wave plate 28a is placed to face the first area 25A of the light separation and combining element 25. In the embodiment, the placement of the first wave plate 28a and the first area 25A facing each other refers to a placement of the first area 25A at an angle of 45° relative to the surface of the first wave plate 28a on the optical axis ax1. In the plan view from the direction along the optical axis ax1, the first wave plate 28a is provided to substantially overlap with the first area 25A.

In the embodiment, the first wave plate 28a is provided between the light separation and combining element 25 and the diffuse reflection element 30 and placed to face the first area 25A of the light separation and combining element 25, and thus, the blue light LB1 transmitted through the first area 25A efficiently enters the first wave plate 28a.

The principal ray of the blue light LB1 entering the first area 25A coincides with the optical axis ax1 of the blue light B, and therefore, the blue light LB1 enters the first wave plate 28a placed on the optical axis ax1 as a parallel light. Thus, the first wave plate 28a functions as a wave plate for the blue light LB1 entering the first wave plate 28a as the parallel light, and may provide a predetermined phase difference to the blue light LB1.

The first wave plate 28a includes a quarter wave plate placed in the optical path between the light separation and combining element 25 and the diffuse reflection element 30. The quarter wave plate is a wave plate formed using crystal quartz.

In the embodiment, the first wave plate 28a is placed in the optical path of the blue light LB1 corresponding to a part of the blue light B output from the blue array light source 20. Accordingly, the size of the first wave plate 28a is smaller than that when a wave plate is placed in the whole optical path of the blue light LB. Generally, the crystal quartz wave plate is very expensive, and the cost of the light source device 2 can be reduced by downsizing of the first wave plate 28a.

The first wave plate 28a converts the blue light LB1 into e.g. a blue light LBc1 as a right-handed circularly-polarized light. In the embodiment, the blue light LBc1 corresponds to a circularly-polarized second light having the first wavelength.

The blue light LBc1 enters the second collecting system 29. The second collecting system 29 includes e.g. lenses 29a, 29b. The blue light LBc1 through the homogenizer system 23 and the second collecting system 29 enters the diffuse reflection element 30 in the homogenized illuminance distribution.

The diffuse reflection element 30 includes a diffuser 30a in a circular disc shape and a rotation drive part 30b that rotates the diffuser 30a. It is preferable that the diffuser 30a Lambert-reflects the blue light LBc1 entering the diffuser 30a.

The diffuse reflection element 30 is placed in a position having a mirror-image relationship with that of the wavelength conversion element 27 in the light separation and combining element 25, and diffusely reflects the blue light LBc1 output from the second collecting system 29 toward the light separation and combining element 25. As the diffuse reflection element 30, it is preferable to use a material that Lambert-reflects the blue light LBc1 without disturbing the polarization state.

Hereinafter, the light diffusely reflected by the diffuse reflection element 30 is referred to as "blue light LBc2". According to the embodiment, the blue light LBc2 in the substantially homogenized illuminance distribution may be obtained by diffuse reflection of the blue light LBc1. For example, the right-handed circularly-polarized blue light LBc1 is reflected as the left-handed circularly-polarized blue light LBc2. The blue light LBc2 is converted into a parallel light by the second collecting system 29, and then, enters the first wave plate 28a again.

Here, the blue light LBc2 is the light formed by diffusion of the blue light LBc1, and thus, the luminous flux width of the blue light LBc2 is larger than the luminous flux width of the blue light LBc1. Accordingly, only the light of the blue light LBc2 located in the optical path of the blue light LBc1 enters the first wave plate 28a and the light spreading to the outer side than the optical path of the blue light LBc1 does not enter the first wave plate 28a.

The blue light LBc2 output from the diffuse reflection element 30 and entering the first wave plate 28a is converted into a blue light LBs as an S-polarized light (in a second polarization direction) by the first wave plate 28a. In the embodiment, the blue light LBs corresponds to a third light having the first wavelength in the second polarization direction.

The blue light LBs output from the first wave plate 28a enters the first area 25A of the light separation and combining element 25 again. The blue light LBs is converted into the S-polarized light, and thereby, reflected by the first area 25A of the light separation and combining element 25. The blue light LBs reflected by the first area 25A of the light separation and combining element 25 enters the second wave plate 28b.

The second wave plate 28b is placed to face the first area 25A of the light separation and combining element 25. In the embodiment, the placement of the second wave plate 28b and the first area 25A facing each other refers to a placement of the first area 25A at an angle of 45° relative to the surface of the second wave plate 28b on the illumination light axis ax2. In the plan view from the direction along the illumination light axis ax2, the second wave plate 28b is provided to substantially overlap with the first area 25A. That is, the second wave plate 28b is provided between the light separation and combining element 25 and the optical integration system 31 and placed to face the first area 25A of the light separation and combining element 25.

In the embodiment, the second wave plate 28b is placed to face the first area 25A of the light separation and combining element 25, and thereby, the blue light LBs reflected by the first area 25A efficiently enters the second wave plate 28b. The second wave plate 28b is placed in the optical path of the light through the first wave plate 28a. Accordingly, the size of the second wave plate 28b is the same as the size of the first wave plate 28a.

The principal ray of the blue light LBs reflected by the first area 25A coincides with the illumination light axis ax2, and therefore, the blue light LBs enters the second wave plate 28b placed on the illumination light axis ax2 as a parallel light. Thus, the second wave plate 28b functions as a wave plate for the blue light LBs entering the second wave plate 28b as the parallel light and may provide a predetermined phase difference to the blue light LBs.

The second wave plate 28b includes a quarter wave plate placed in the optical path between the light separation and combining element 25 and the optical integration system 31. The quarter wave plate is a wave plate formed using crystal quartz.

The second wave plate 28b converts the blue light LBs into e.g. a blue light LBc3 as a left-handed circularly-polarized light. In the embodiment, the blue light LBc3 corresponds to a circularly-polarized fifth light having the first wavelength.

On the other hand, the blue light LBc2 output from the diffuse reflection element 30, but not entering the first wave plate 28a enters the second area 25B of the light separation and combining element 25. The blue light LBc2 is reflected by the second area 25B (dichroic mirror) toward the optical integration system 31.

In the embodiment, the principal ray of the blue light LBc1 entering the diffuser 30a coincides with the optical axis ax1. Accordingly, the blue light LBc2 diffusely reflected by the diffuse reflection element 30 is isotopically diffused in all directions and the blue light LBc2 is a luminous flux having a section in a substantially circular shape.

If the principal ray of the blue light LBc1 entering the diffuser 30a does not coincide with the optical axis ax1, that is, if the first area 25A is not placed on the optical axis ax1, the luminous flux shape of the blue light LBc2 is distorted. The blue light LBc2 does not enter the whole optical integration system 31, and the optical integration system 31 fails to efficiently function.

According to the light source device 2 of the embodiment, the blue light LBc2 having the section in the substantially circular shape efficiently enters the whole optical integration system 31, and the optical integration system 31 may effectively function.

In the light source device 2 of the embodiment, a laser beam (blue light) having higher energy output from the blue array light source 20 enters the second collecting system 29. Accordingly, a photo-elastic effect (birefringence) easily occurs due to the temperature rise in the second collecting system 29. When birefringence occurs in the second collecting system 29, the polarization state of the light transmitted through the second collecting system 29 is disturbed.

In the light source device 2 of the embodiment, a configuration for polarization separation of the blue light in the polarization state converted after the blue light passes through the first wave plate 28a at twice by the light separation and combining element 25 is employed.

Here, it is assumed that one-third of light of the entire luminous flux width in the blue light LBc2 diffusely reflected by the diffuse reflection element 30 enters the first wave plate 28a. In this case, a ratio between the luminous flux area entering the first wave plate 28a of the blue light LBc2 and the luminous flux area not entering the first wave plate 28a of the blue light LBc2 is 1:8. That is, most (8/9) of the blue light LBc2 diffusely reflected by the diffuse reflection element 30 is not used for polarization separation in the light separation and combining element 25.

According to the configuration of the light source device 2 of the embodiment, if the polarization state in the above described second collecting system 29 is disturbed, the influence on the polarization separation in the light separation and combining element 25 may be reduced. Accordingly, in the light source device 2 of the embodiment, it is not necessary to form the second collecting system 29 using quartz lenses with the smaller coefficient of thermal expansion for reduction of the influence by the photo-elastic effect (birefringence) in the second collecting system 29. Therefore, the cost rise by the second collecting system 29 using the expensive quartz lenses may be suppressed.

Further, the blue light LB2 reflected by the second area 25B enters the first collecting system 26. The first collecting system 26 collects the blue light LB2 toward the wavelength conversion element 27.

In the embodiment, the first collecting system 26 includes e.g. a first lens 26a and a second lens 26b. The blue light LB2 through the homogenizer system 23 and the first collecting system 26 enters the illuminated region of the wavelength conversion element 27 in the homogenized illuminance distribution. The wavelength conversion element 27 has a fluorescent material 34, a substrate 35 supporting the fluorescent material 34, and a fixing member 36 fixing the fluorescent material 34 to the substrate 35.

In the embodiment, the fluorescent material 34 is fixed to the substrate 35 by the fixing member 36 provided between a side surface of the fluorescent material 34 and the substrate 35. The fluorescent material 34 contacts the substrate 35 on a surface opposite to the side that the blue light LB2 enters.

The fluorescent material 34 includes a fluorescent material excited by absorbing the blue light LB2. The fluorescent material excited by the blue light LB2 outputs the fluorescent light (yellow fluorescence) YL in e.g. a wavelength range from 500 to 700 nm. A reflection layer 37 is provided between the fluorescent material 34 and the substrate 35. The reflection layer 37 reflects a component traveling toward the substrate 35 of the fluorescent light YL generated in the fluorescent material 34.

A heat sink 38 is placed on a surface opposite to the supporting surface for the fluorescent material 34 in the substrate 35. In the wavelength conversion element 27, heat may be released via the heat sink 38 and thermal degradation of the fluorescent material 34 may be prevented.

The fluorescent light YL output from the fluorescent material 34 is a non-polarized light. The fluorescent light YL is parallelized by the first collecting system 26 and enters the light separation and combining element 25. The fluorescent light YL entering the light separation and combining element 25 is transmitted through the first area 25A and the second area 25B and output toward the optical integration system 31. Note that part of the fluorescent light YL is transmitted through the second wave plate 28b provided on the illumination light axis ax2, however, the fluorescent light YL as the non-polarized light is not affected by the second wave plate 28b.

The blue light LBc2, the blue light LBc3, and the fluorescent light YL are combined in the above described manner, and thereby, the white illumination light WL is generated. The white illumination light WL is separated into the red light LR, the green light LG, and the blue light LB in the color separation and light guiding system 200. The blue light LBc2 and the blue light LBc3 are separated as the blue light LB and the fluorescent light YL is separated as the red light LR and the green light LG.

The explanation will be made with reference to FIG. 2.

The illumination light WL enters the optical integration system 31. The optical integration system 31 has a first multi-lens 31a and a second multi-lens 31b. The first multi-lens 31a has a plurality of first small lenses 31am for splitting the illumination light WL into a plurality of partial luminous fluxes.

The lens surface of the first multi-lens 31a (the surfaces of the first small lenses 31am) and the respective image formation areas of the light modulation device 400R, the light modulation device 400G, and the light modulation device 400B are conjugated with each other. Accordingly, the shapes of the respective first small lenses 31am are substantially similar shapes (rectangular shapes) to the shapes of the image formation areas of the light modulation device 400R, the light modulation device 400G, and the light modulation device 400B. Thereby, the respective partial luminous fluxes output from the first multi-lens 31a respectively efficiently enter the image formation areas of the light modulation devices 400R, 400G, 400B.

The second multi-lens 31b has a plurality of second small lenses 31bm corresponding to the plurality of first small lenses 31am of the first multi-lens 31a. The second multi-lens 31b forms images of the respective first small lenses 31am of the first multi-lens 31a near the respective image formation areas of the respective light modulation devices 400R, 400G, 400B with the superimposing lens 33.

The illumination light WL transmitted through the optical integration system 31 enters the polarization conversion element 32.

The polarization conversion element 32 is formed by arrangement of polarization separation layers and wave plates (half wave plates) in an array form. The polarization conversion element 32 is an optical element that aligns the polarization direction of the illumination light WL in a predetermined direction. More specifically, the polarization conversion element 32 is an optical element to set the illumination light WL in correspondence with directions of the transmission axes of the polarizers (not shown) placed at the light incident sides of the light modulation device 400R, the light modulation device 400G, and the light modulation device 400B.

Thereby, the polarization directions of the red light LR, the green light LG, and the blue light LB obtained by separation of the illumination light WL transmitted through the polarization conversion element 32 correspond to the directions of the transmission axes of the light incident-side polarizers of the respective light modulation devices 400R, 400G, 400B. Therefore, the red light LR, the green light LG, and the blue light LB enter the image formation areas of the light modulation devices 400R, 400G, 400B in good condition, respectively, without being respectively shielded by the light incident-side polarizers.

The illumination light WL transmitted through the polarization conversion element 32 enters the superimposing lens 33. The superimposing lens 33 homogenizes the illuminance distribution in the illuminated region in cooperation with the optical integration system 31.

Here, when the light entering the polarization conversion element 32 is formed only by one polarization component (S-polarized light or P-polarized light), homogeneity of the light intensity distribution after transmission through the polarization conversion element 32 is lower compared to a case where the light is formed by both of the polarization components (S-polarized light and P-polarized light).

In related art, when a light entering a polarization conversion element is formed only by one polarization component, a quarter wave plate is provided at the upstream of the polarization conversion element 32 to convert the light entering the polarization conversion element 32 into a circularly-polarized light. However, in this case, the cost is higher by the quarter wave plate separately provided at the upstream of the polarization conversion element 32.

In the light source device 2 of the embodiment, the illumination light WL containing the blue light LBc2 and the blue light LBc3 as the circularly-polarized lights and the fluorescent light YL as the non-polarized light enters the polarization conversion element 32. The blue light LBc2 and the blue light LBc3 as the circularly-polarized lights contain the S-polarized light component and the P-polarized light component substantially at the same rate. Further, the fluorescent light YL as the non-polarized light contains the S-polarized light component and the P-polarized light component substantially at the same rate like the circularly-polarized lights.

The light source device 2 of the embodiment enters the illumination light WL containing both the S-polarized light component and the P-polarized light component substantially at the same rate in the polarization conversion element 32, and thereby, may improve the homogeneity of the light intensity distribution of the illumination light WL transmitted through the polarization conversion element 32. Further, the red light LR, the green light LG, and the blue light LB formed by color separation of the illumination light WL having the higher homogeneity of the light intensity distribution homogeneously illuminate the image formation areas of the respective light modulation devices 400R, 400G, 400B, and thereby, an excellent image may be displayed.

The light source device 2 of the embodiment includes the light quantity monitoring mirror 42 in the optical path between the optical integration system 31 and the polarization conversion element 32. The light quantity monitoring mirror 42 is a half mirror and placed at an angle of 45° relative to the illumination light axis ax2. The light quantity monitoring mirror 42 transmits part of the incident light and reflects the rest. The light transmitted through the light quantity monitoring mirror 42 enters the polarization conversion element 32 and the light reflected by the light quantity monitoring mirror 42 enters the sensor unit 43.

Figure 7:
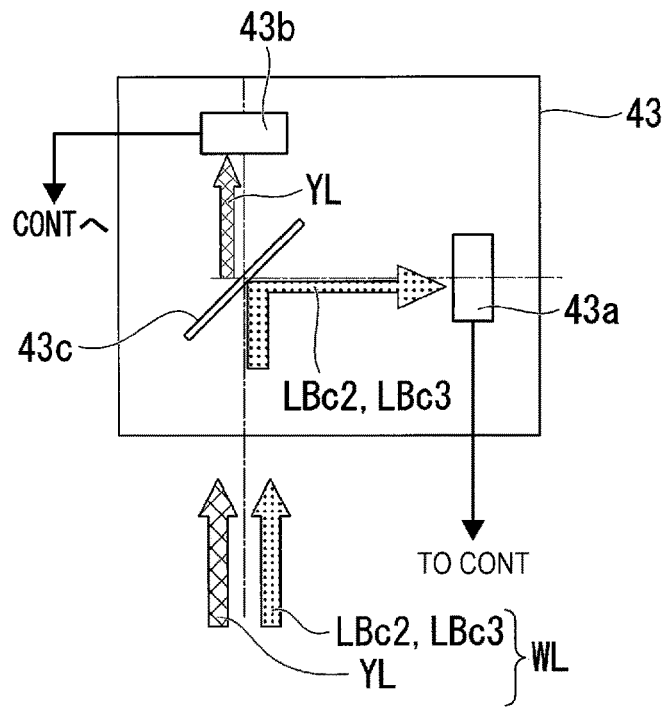
FIG. 7 shows a schematic configuration of a sensor unit.
Figure 8:
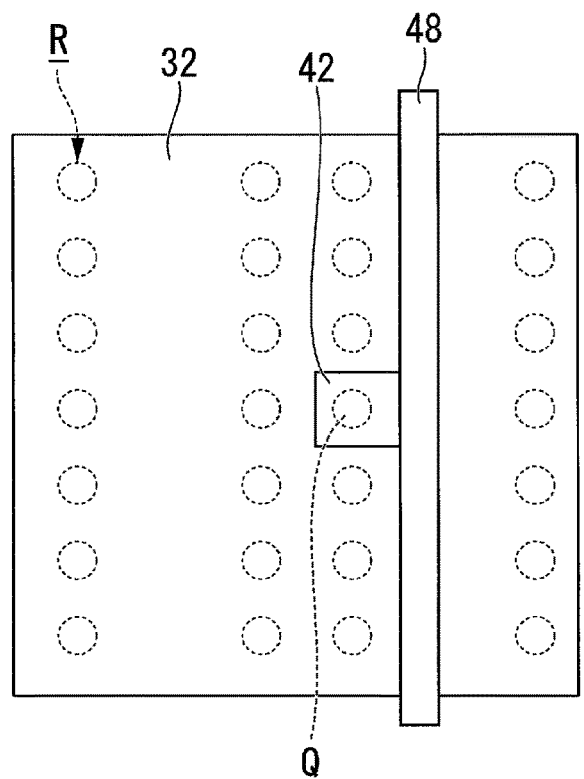
FIG. 8 is a front view showing a placement of a mirror in a polarization conversion element.

FIG. 7 shows the schematic configuration of the sensor unit 43. FIG. 8 is the front view showing the placement of the mirror in the polarization conversion element.

As shown in FIG. 7, the sensor unit 43 includes a first sensor 43a, a second sensor 43b, and a dichroic mirror 43c. The dichroic mirror 43c is formed using a dielectric multi-layer film, and has an optical property of transmitting the fluorescent light YL contained in the illumination light WL and reflecting the blue light LBc2 and the blue light LBc3 as the blue components contained in the illumination light WL.

The first sensor 43a measures quantities of the blue lights LBc2, LBc3 reflected by the dichroic mirror 43c of the illumination light WL reflected by the light quantity monitoring mirror 42. The second sensor 43b measures the quantity of the fluorescent light YL transmitted through the dichroic mirror 43c of the illumination light WL reflected by the light quantity monitoring mirror 42. The first sensor 43a and the second sensor 43b transmit measurement results to the control unit CONT. The control unit CONT controls driving of the blue array light source 20 based on the measurement results of the first sensor 43a and the second sensor 43b as will be described later.

Note that the example in which the second sensor 43b measures the quantity of the fluorescent light YL is shown, however, the sensor may measure only a partial wavelength of the fluorescent light YL e.g. the red component or green component of the fluorescent light YL. Even when the second sensor 43b measures the red component or green component of the fluorescent light YL, the detection value of the second sensor 43b is equivalent to the measurement result for the fluorescent light YL.

As shown in FIG. 8, the light quantity monitoring mirror 42 is held by a holding member 48 placed around light incident areas R of the polarization conversion element 32. The light incident areas R of the polarization conversion element 32 are areas that a plurality of small luminous fluxes output from the optical integration system 31 respectively enter.

The light quantity monitoring mirror 42 is placed in a position in which a two-dimensional light source image Q of the illumination light WL by the second multi-lens 31b is formed. Accordingly, illuminance unevenness is not produced on the light modulation device 400R, the light modulation device 400G, and the light modulation device 400B as the illuminated regions.

Note that, in the embodiment, the example in which the light quantity monitoring mirror 42 is placed in the optical path between the optical integration system 31 and the polarization conversion element 32 is shown. In place of the example, the light quantity monitoring mirror 42 may be placed in the optical path between the polarization conversion element 32 and the superimposing lens 33. The light quantity monitoring mirror 42 may use leakage light from the dichroic mirror 210, the dichroic mirror 220, the reflection mirror 230, the reflection mirror 240, and the reflection mirror 250 provided in the color separation and light guiding system 200.

The light source device 2 of the embodiment can adjust color balance (white balance) of the illumination light WL. As below, a method of adjusting the color balance of the illumination light WL in the light source device 2 will be explained.

The light source device 2 measures the quantities (intensities) of the blue lights LBc2, LBc3 and the quantity (intensity) of the yellow fluorescent light YL contained in the light extracted from the light quantity monitoring mirror 42 using the sensor unit 43. The measurement results of the sensor unit 43 are transmitted to the control unit CONT.

The control unit CONT stores ratios between the blue light intensity and the yellow light intensity (intensity ratios) according to the hues of the output illumination light WL as data in advance. For example, the control unit CONT controls driving of the blue array light source 20 to bring the intensity ratio closer to the intensity ratio of the data corresponding to the white balance designated by a user of the projector.

Specifically, the control unit CONT controls the quantity of the blue light LB1 entered into the first area 25A of the light separation and combining element 25. The blue light LB1 entering the first area 25A contains the blue beam B1 output from the first light emitting element 21a (see FIG. 4) of the plurality of light emitting elements 21 forming the blue array light source 20. In the embodiment, the control unit CONT controls the quantity of the blue light LB1 entered into the first area 25A by adjustment of the output of the first light emitting element 21a of the plurality of light emitting elements 21.

For example, the control unit CONT may increase the quantity of the blue light LB1 entered into the first area 25A by increasing the output of the first light emitting element 21a and increase a ratio of the blue component (blue light LBc2 and the blue light LBc3) to the yellow component (fluorescent light YL) contained in the illumination light WL. Thereby, the quantity of light of the blue component to the quantity of light of the yellow component relatively increases and the illumination light WL changes to a white light with a bluish tint.

On the other hand, the control unit CONT may decrease the quantity of the blue light LB1 entered into the first area 25A by decreasing the output of the first light emitting element 21a and decrease the ratio of the blue component (blue light LBc2 and the blue light LBc3) to the yellow component (fluorescent light YL) contained in the illumination light WL. Thereby, the quantity of light of the yellow component to the quantity of light of the blue component relatively increases and the illumination light WL changes to a white light with a yellowish tint.

As described above, according to the light source device 2 of the embodiment, the quantity of the blue light LB1 entered into the first area 25A is controlled by the control unit CONT based on the measurement results of the sensor unit 43, and thereby, the white balance of the illumination light WL may be adjusted. Therefore, according to the light source device 2 of the embodiment, the illumination light WL having desired white balance may be generated.

As described above, according to the light source device 2 of the embodiment, the first wave plate 28a is provided in the optical path of the blue light LB1 corresponding to a part of the blue light B output from the blue array light source 20, and thus, the cost reduction may be realized by downsizing of the first wave plate 28a formed using crystal quartz.

Further, according to the light source device 2 of the embodiment, the second wave plate 28b is provided in the optical path of the blue light LBs output from the first wave plate 28a, and thus, the cost reduction may be realized by downsizing of the second wave plate 28b formed using crystal quartz.

Furthermore, according to the light source device 2 of the embodiment, the quantity of the blue light LB1 entered into the first area 25A of the light separation and combining element 25 is controlled based on the measurement results of the sensor unit 43, and thereby, the white balance of the illumination light WL may be adjusted.

According to the projector 1 of the embodiment, the light source device 2 with the reduced cost by downsizing of the first wave plate 28a and the second wave plate 28b is provided, and thereby, the cost reduction of the projector 1 may be also realized. Further, according to the projector 1 of the embodiment, an image with a desired hue may be displayed by adjustment of the white balance of the illumination light WL using the light source device 2.

Second Embodiment

Subsequently, a light source device according to the second embodiment of the present disclosure will be explained using the drawings. The configurations and members in common with the first embodiment have the same signs and the detailed explanation will be omitted.

Figure 9:
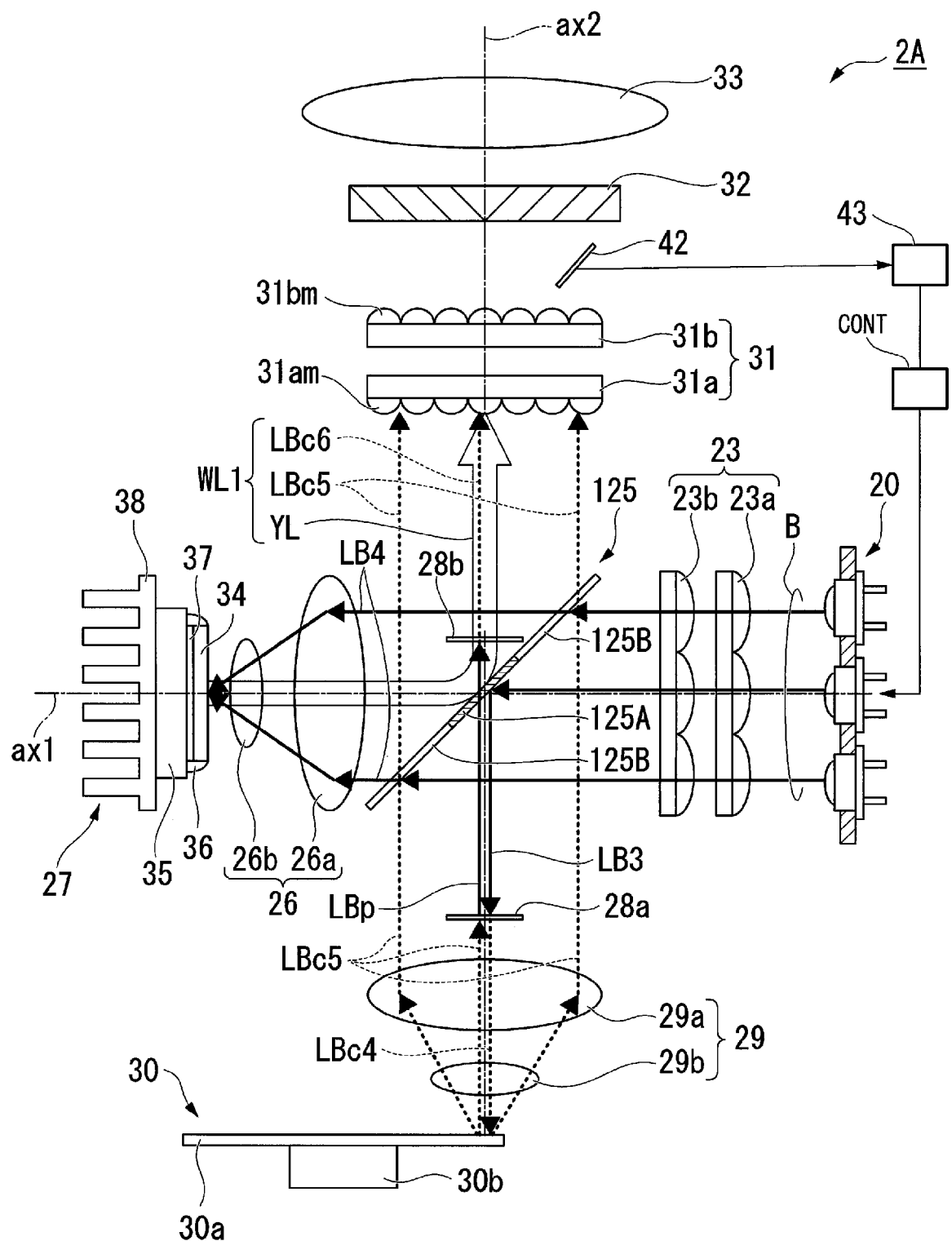
FIG. 9 shows a schematic configuration of a light source device of a second embodiment.

FIG. 9 shows the schematic configuration of the light source device 2A of the embodiment.

As shown in FIG. 9, the light source device 2A of the embodiment includes the blue array light source 20, the homogenizer system 23, a light separation and combining element (first optical element) 125, the first collecting system 26, the wavelength conversion element 27, the first wave plate 28a, the second collecting system 29, the diffuse reflection element 30, the second wave plate 28b, the optical integration system 31, the polarization conversion element 32, the superimposing lens 33, the light quantity monitoring mirror 42, the sensor unit 43, and the control unit CONT.

In the embodiment, the blue array light source 20, the homogenizer system 23, the light separation and combining element 125, the first collecting system 26, and the wavelength conversion element 27 are sequentially placed in juxtaposition on the optical axis ax1 of the blue array light source 20. Further, the diffuse reflection element 30, the second collecting system 29, the first wave plate 28a, the light separation and combining element 125, the second wave plate 28b, the optical integration system 31, the polarization conversion element 32, and the superimposing lens 33 are sequentially placed in juxtaposition on the illumination light axis ax2.

The light separation and combining element 125 includes a first area 125A and a second area 125B. The first area 125A is an area reflecting the blue light B. The second area 125B is an area transmitting the blue light B. Hereinafter, the blue light B reflected by the first area 125A is referred to as "blue light LB3" and the blue light B transmitted through the second area 125B is referred to as "blue light LB4".

The first area 125A is formed using a polarization beam splitter. That is, the first area 125A transmits the light entering the polarization beam splitter as the P-polarized light and reflects the light entering the polarization beam splitter as the S-polarized light. In the embodiment, the blue light B output from the blue array light source 20 is S-polarized light (in the first polarization direction) with respect to the polarization beam splitter, and thereby, the first area 125A can reflect the blue light LB. Further, the polarization beam splitter forming the first area 125A has a color separation function of transmitting the fluorescent light YL output from the wavelength conversion element 27 and having the different wavelength range from the blue light B regardless of the polarization state thereof.

Note that the second area 125B is formed using a dichroic mirror having an optical property of transmitting the blue light B and reflecting the fluorescent light YL. Here, whether the blue light B output from the blue array light source 20 is the P-polarized light or the S-polarized light with respect to the first area 125A of the light separation and combining element 125 may be changed by rotation of the placement state of the blue array light source 20 about the optical axis ax1 as a rotation axis.

In the light separation and combining element 125 of the embodiment, the center of the first area 125A coincides with the intersection point of the optical axis ax1 and the illumination light axis ax2. The light separation and combining element 125 is placed at an angle of 45° relative to the optical axis ax1 and the illumination light axis ax2. In the plan view of the light separation and combining element 125 in the direction along the optical axis ax1, the planar shape of the first area 125A is a circular shape. In the embodiment, the optical axis ax1 passes through the center of the first area 125A.

The first wave plate 28a is placed to face the first area 125A of the light separation and combining element 125. In the embodiment, the placement of the first wave plate 28a and the first area 125A facing each other refers to a placement of the first area 125A at an angle of 45° relative to the surface of the first wave plate 28a on the optical axis ax1. In the plan view from the direction along the optical axis ax1, the first wave plate 28a is provided to substantially overlap with the first area 125A.

In the embodiment, the first wave plate 28a is provided between the light separation and combining element 125 and the diffuse reflection element 30 and placed to face the first area 125A of the light separation and combining element 125, and thus, the blue light LB3 reflected by the first area 125A efficiently enters the first wave plate 28a.

The principal ray of the blue light LB3 entering the first area 125A coincides with the illumination light axis ax2 of the blue light B, and therefore, the blue light LB3 enters the first wave plate 28a placed on the illumination light axis ax2 as a parallel light. Thus, the first wave plate 28a functions as a wave plate for the blue light LB3 entering as the parallel light, and may provide a predetermined phase difference to the blue light LB3.

In the embodiment, the first wave plate 28a is placed in the optical path of the blue light LB3 reflected by the first area 125A. The first wave plate 28a converts the blue light LB3 into e.g. a blue light LBc4 as a left-handed circularly-polarized light. The blue light LBc4 is diffusely reflected by the diffuse reflection element 30 and reflected as a right-handed circularly-polarized blue light LBc5. The blue light LBc4 is converted into a parallel light by the second collecting system 29, and then, enters the first wave plate 28a again.

The blue light LBc5 output from the diffuse reflection element 30 and entering the first wave plate 28a is converted into a blue light LBp as a P-polarized light (in the second polarization direction) by the first wave plate 28a. In the embodiment, the blue light LBp corresponds to the third light having the first wavelength in the second polarization direction.

The blue light LBp output from the first wave plate 28a enters the first area 125A of the light separation and combining element 125. The blue light LBp is converted into the P-polarized light, and thereby, transmitted through the first area 125A of the light separation and combining element 125.

In the embodiment, the second wave plate 28b is placed to face the first area 125A of the light separation and combining element 125 at the opposite side to the first wave plate 28a in the first area 125A on the illumination light axis ax2.

In the embodiment, the placement of the second wave plate 28b and the first area 125A facing each other refers to a placement of the first area 125A at an angle of 45° relative to the surface of the second wave plate 28b on the illumination light axis ax2. In the plan view from the direction along the illumination light axis ax2, the second wave plate 28b is provided to substantially overlap with the first area 125A. That is, the second wave plate 28b is provided between the light separation and combining element 125 and the optical integration system 31 and placed to face the first area 125A of the light separation and combining element 125.

The blue light LBp transmitted through the first area 125A of the light separation and combining element 125 enters the second wave plate 28b. The second wave plate 28b converts the blue light LBp into e.g. a blue light LBc6 as a right-handed circularly-polarized light. In the embodiment, the blue light LBc6 corresponds to the circularly-polarized fifth light having the first wavelength.

On the other hand, the blue light LBc5 output from the diffuse reflection element 30, but not entering the first wave plate 28a is transmitted through the second area 125B of the light separation and combining element 125 and travels toward the diffuse reflection element 30.

The blue light LB4 transmitted through the second area 125B is collected onto the fluorescent material 34 of the wavelength conversion element 27 by the first collecting system 26, and thereby, the fluorescent light YL is generated. The fluorescent light YL is parallelized by the first collecting system 26 and enters the light separation and combining element 125. The fluorescent light YL entering the light separation and combining element 125 is reflected by the first area 125A and the second area 125B and output toward the optical integration system 31.

In the light source device 2A of the embodiment, the blue light LBc5, the blue light LBc6, and the fluorescent light YL are combined, and thereby, a white illumination light WL1 is generated. The white illumination light WL1 is separated into a red light LR, a green light LG, and a blue light LB in the color separation and light guiding system 200 (see FIG. 1). The blue light LBc5 and the blue light LBc6 are separated as the blue light LB and the fluorescent light YL is separated as the red light LR and the green light LG.

Also, in the light source device 2A of the embodiment, the same effects as those of the light source device 2 of the first embodiment may be exerted. That is, according to the light source device 2A of the embodiment, the first wave plate 28a is provided in the optical path of the blue light LB3 corresponding to a part of the blue light B output from the blue array light source 20, and thus, the cost reduction may be realized by downsizing of the first wave plate 28a formed using crystal quartz. Further, according to the light source device 2A of the embodiment, the second wave plate 28b is provided in the optical path of the blue light LBp output from the first wave plate 28a, and thus, the cost reduction may be realized by downsizing of the second wave plate 28b formed using crystal quartz. Furthermore, according to the light source device 2A of the embodiment, white balance of the illumination light WL1 may be adjusted.

According to a projector including the light source device 2A of the embodiment, the cost reduction may be realized and an image with a desired hue may be displayed by adjustment of the white balance of the illumination light WL1.

The present disclosure is not limited to the above described embodiments, but can appropriately be changed without departing from the scope of the present disclosure.

For example, in the above described embodiments, the structure of rotating the diffuser 30a is taken as an example of the diffuse reflection element 30, however, a stationary-type structure without rotating the diffuser may be employed. Further, the structure of radiating the excitation light to the fluorescent material 34 fixedly placed is taken as an example of the wavelength conversion element 27, however, a rotary-wheel structure in which a ring-shaped fluorescent material is placed on a rotatable circular disc may be employed.

In the above described embodiments, the example in which the light source device according to the present disclosure is mounted on the projector is shown, but the device is not limited to that. The light source device according to the present disclosure may be applied to a lighting device, a headlight of an automobile, or the like.

What is claimed is:

1. A light source device comprising:
   a light emitting device that outputs a first light having a first wavelength in a first polarization direction;
   a first optical element having a first area that transmits or reflects the first light and a second area that reflects the first light when the first light is transmitted through the first area or transmits the first light when the first light is reflected by the first area;
   a second optical element into which the first light output from the first area of the first optical element is entered, converting the first light into a circularly-polarized second light having the first wavelength;
   a diffuser element into which the second light output from the second optical element is entered; and
   a wavelength conversion element into which the first light output from the second area of the first optical element is entered, wherein
   the light output from the diffuser element and entered into the second optical element is converted into a third light having the first wavelength in a second polarization direction by the second optical element,
   the third light output from the second optical element and entered into the first area of the first optical element is output from the first area,
   the light output from the diffuser element and entered into the second area of the first optical element is output from the second area of the first optical element, and
   a fourth light output from the wavelength conversion element and entered into the first area and the second area of the first optical element and having a second wavelength is output through the first area and the second area of the first optical element.

2. The light source device according to claim 1, wherein in the first optical element, the first area is provided at a center of the first optical element and the second area is provided to surround the first area.

3. A projector comprising:
   the light source device according to claim 2;
   a light modulation device that modulates the light output from the light source device according to image information and forms an image light; and
   a projection optical device that projects the image light.

4. The light source device according to claim 1, wherein the second optical element is placed to face the first area at one side of the first optical element.

5. A projector comprising:
   the light source device according to claim 4;
   a light modulation device that modulates the light output from the light source device according to image information and forms an image light; and
   a projection optical device that projects the image light.

6. The light source device according to claim 1, further comprising:
   a detection unit that detects the light output from the first optical element; and
   a control unit that controls a quantity of the first light entered into the first area of the first optical element based on a detection result of the detection unit.

7. A projector comprising:
   the light source device according to claim 6;
   a light modulation device that modulates the light output from the light source device according to image information and forms an image light; and
   a projection optical device that projects the image light.

8. The light source device according to claim 1, wherein the second optical element is formed using quartz crystal.

9. A projector comprising:
   the light source device according to claim 8;
   a light modulation device that modulates the light output from the light source device according to image information and forms an image light; and
   a projection optical device that projects the image light.

10. The light source device according to claim 1, further comprising a third optical element into which the third light output from the first area of the first optical element is entered, wherein
    the third optical element converts the third light into a circularly-polarized fifth light having the first wavelength.

11. The light source device according to claim 10, wherein the third optical element is placed to face the first area at another side of the first optical element.

12. A projector comprising:
    the light source device according to claim 11;
    a light modulation device that modulates the light output from the light source device according to image information and forms an image light; and
    a projection optical device that projects the image light.

13. The light source device according to claim 10, wherein
    the third optical element is formed using quartz crystal.

14. A projector comprising:
    the light source device according to claim 13;
    a light modulation device that modulates the light output from the light source device according to image information and forms an image light; and
    a projection optical device that projects the image light.

15. A projector comprising:
    the light source device according to claim 1;
    a light modulation device that modulates the light output from the light source device according to image information and forms an image light; and
    a projection optical device that projects the image light.

16. A projector comprising:
    the light source device according to claim 10;
    a light modulation device that modulates the light output from the light source device according to image information and forms an image light; and
    a projection optical device that projects the image light.

* * * * *